United States Patent
Wood

(10) Patent No.: US 6,786,016 B1
(45) Date of Patent: Sep. 7, 2004

(54) BASEBOARD AND INSECT CAPTURING ASSEMBLY

(76) Inventor: Weldon B. Wood, P.O. Box 1054, Tolleson, AZ (US) 85353

(*) Notice: Subject to any disclaimer, the term of this patent is extended or adjusted under 35 U.S.C. 154(b) by 0 days.

(21) Appl. No.: 10/447,410

(22) Filed: May 30, 2003

(51) Int. Cl.⁷ .............................. A01M 1/00; E04C 2/00
(52) U.S. Cl. ................... 52/290; 52/718.01; 52/718.04; 52/718.05; 52/717.05; 43/107; 43/121
(58) Field of Search ............................... 52/290, 287.1, 52/288.1, 718.01, 718.04, 718.05, 718.02, 717.05; 43/107, 133, 121

(56) References Cited

U.S. PATENT DOCUMENTS

| | | |
|---|---|---|
| 3,707,061 A | 12/1972 | Colette et al. |
| 4,048,747 A * | 9/1977 | Shanahan et al. ............. 43/114 |
| 4,165,577 A | 8/1979 | Shanahan et al. |
| 4,186,512 A | 2/1980 | Berg |
| 4,423,564 A | 1/1984 | Davies |
| 5,179,811 A | 1/1993 | Walker et al. |
| 5,575,996 A | 11/1996 | Erwin |
| 5,598,681 A * | 2/1997 | DiGianni ................. 52/717.05 |

* cited by examiner

Primary Examiner—Carl D. Friedman
Assistant Examiner—Jennifer I. Thissell

(57) ABSTRACT

A baseboard and insect capturing assembly includes a base panel having a first side, a second side, a top edge, a bottom edge, and a pair of end edges. The base has a plurality of openings extending therethrough for receiving fasteners to be extended through a wall. A trough for holding insecticide is attached to the first side of the base panel. The trough generally extends between the end edges and is positioned generally between the top edge and the bottom edge. A covering is positionable over the base. The covering has an outer surface, an inner surface, an upper edge and a lower edge. The lower edge has a plurality notches therein. A securing assembly is attached to the first side of the base panel and the inner surface of the covering for releasably securing the covering to the base panel.

6 Claims, 5 Drawing Sheets

BASEBOARD AND INSECT CAPTURING ASSEMBLY

BACKGROUND OF THE INVENTION

1. Field of the Invention

The present invention relates to baseboard devices and more particularly pertains to a new baseboard device for bordering the bottom of a wall and for capturing and killing insects.

2. Description of the Prior Art

The use of baseboard devices that can be used for trapping insects is known in the prior art. U.S. Pat. Nos. 4,165,577 and 4,186,512 both describe a baseboard that includes electric means for killing insects that crawl therein. Other types of conventional baseboards are used for decorative uses but do not help in controlling insect infestations.

While these devices fulfill their respective, particular objectives and requirements, the need remains for a device that does not require an electrical hook-up and can be used in a safe manner.

SUMMARY OF THE INVENTION

The present invention meets the needs presented above by including a trough, hidden within the baseboard assembly, on which insecticide is spread for killing insects. After a pre-determined time, most likely between 1 and 2 months, the user removes any dead insects that are found in the trough and to re-apply insecticide.

Another object of the present invention is to provide a new baseboard device that provides an effective decorative function while also acting as an insect trap.

To this end, the present invention generally comprises a base panel having a first side, a second side, a top edge, a bottom edge, and a pair of end edges. The base panel has a plurality of openings extending therethrough for receiving fasteners to be extended through a wall. A trough is attached to the first side of the base panel. The trough generally extends between the end edges and is positioned generally between the top edge and the bottom edge. A covering is positionable over the base panel. The covering has an outer surface, an inner surface, an upper edge and a lower edge. The lower edge is positioned adjacent to a floor surface when the upper edge is positioned adjacent to the top edge of the panel. The lower edge has a plurality notches therein. A securing assembly is attached to the first side of the base panel and the inner surface of the covering for releasably securing the covering to the base panel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
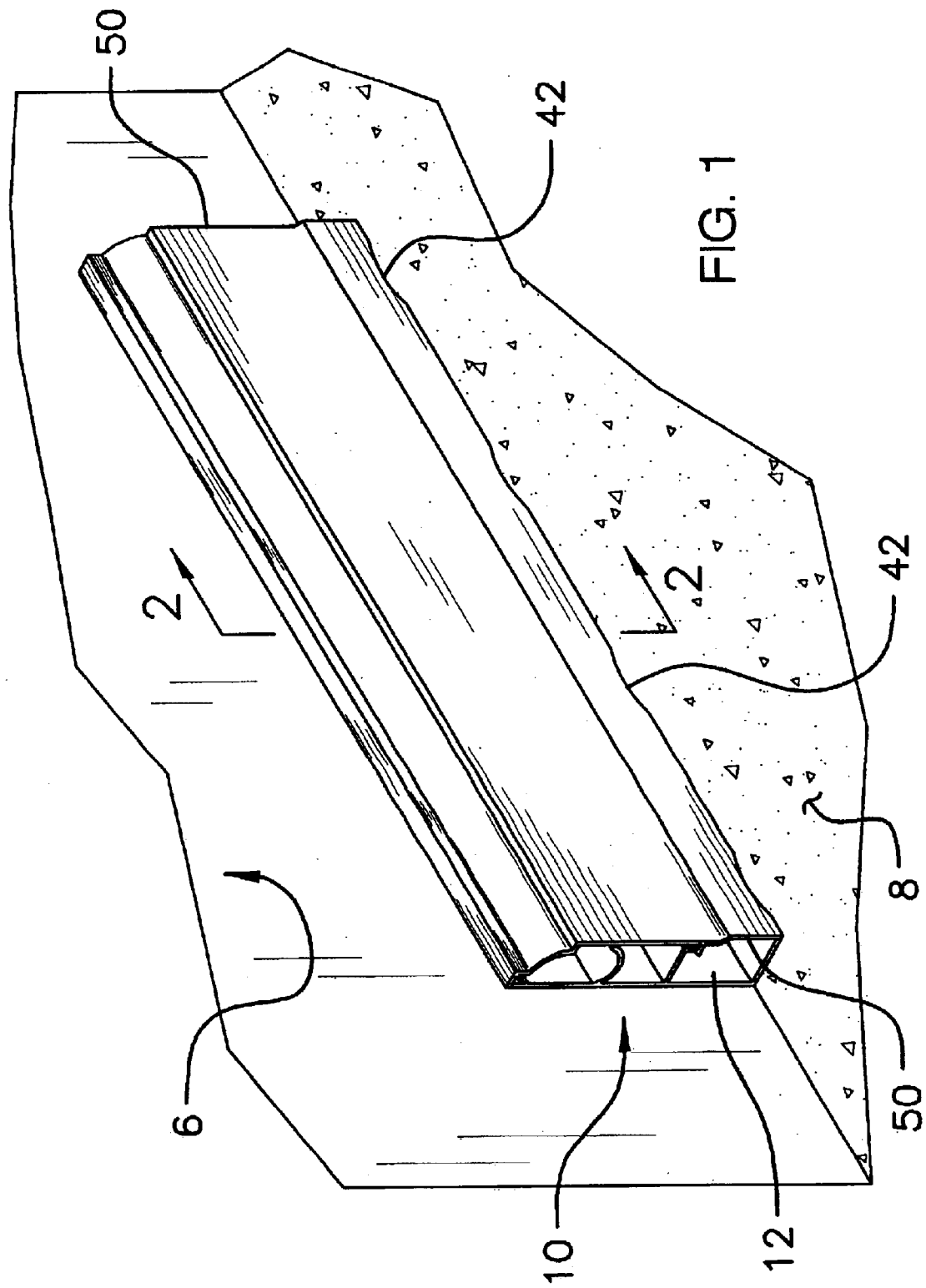
FIG. 1 is a schematic perspective view of a baseboard and insect capturing assembly according to the present invention.
Figure 2:
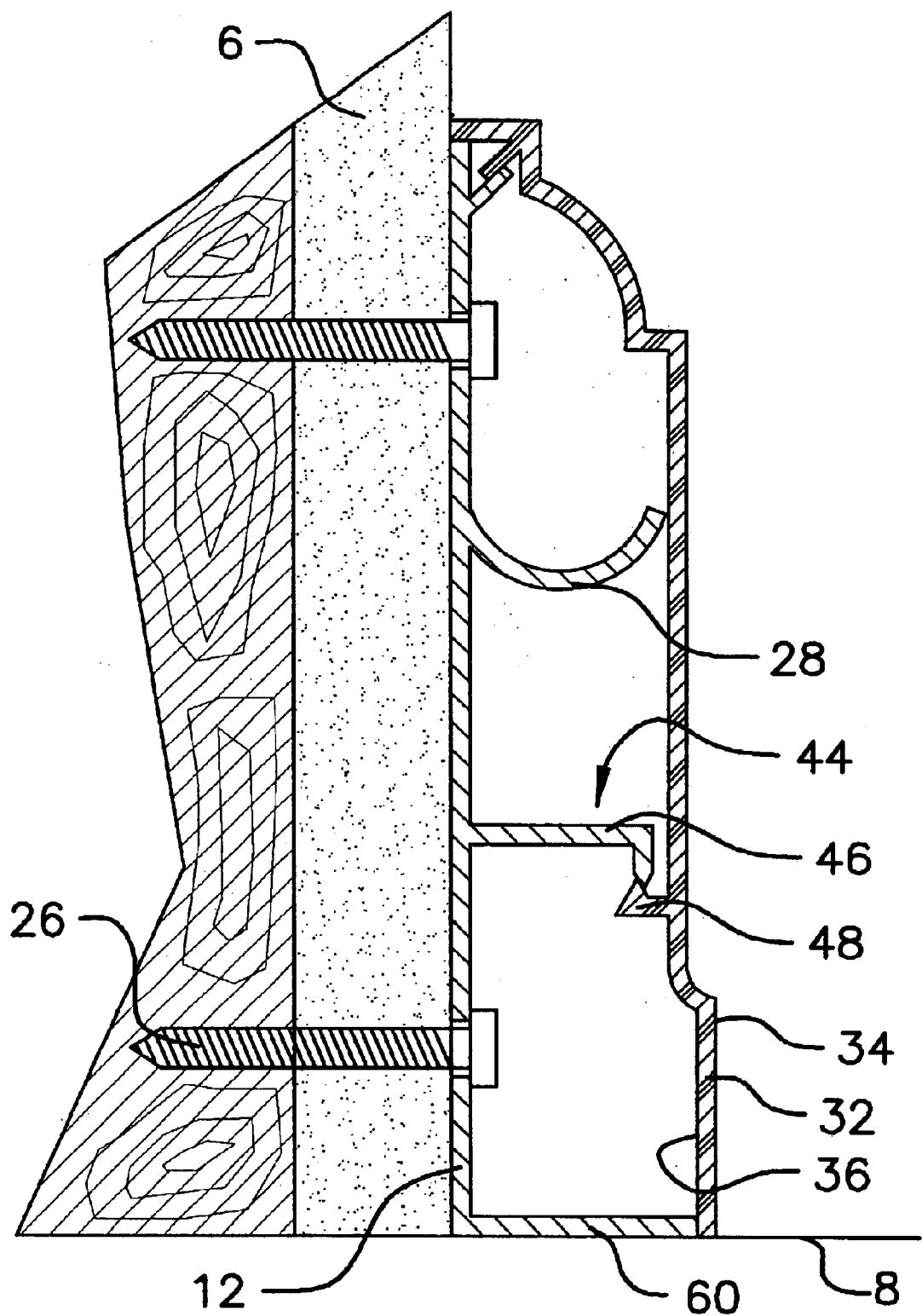
FIG. 2 is a schematic cross-sectional view taken along line 2—2 of FIG. 1 of the present invention.
Figure 3:
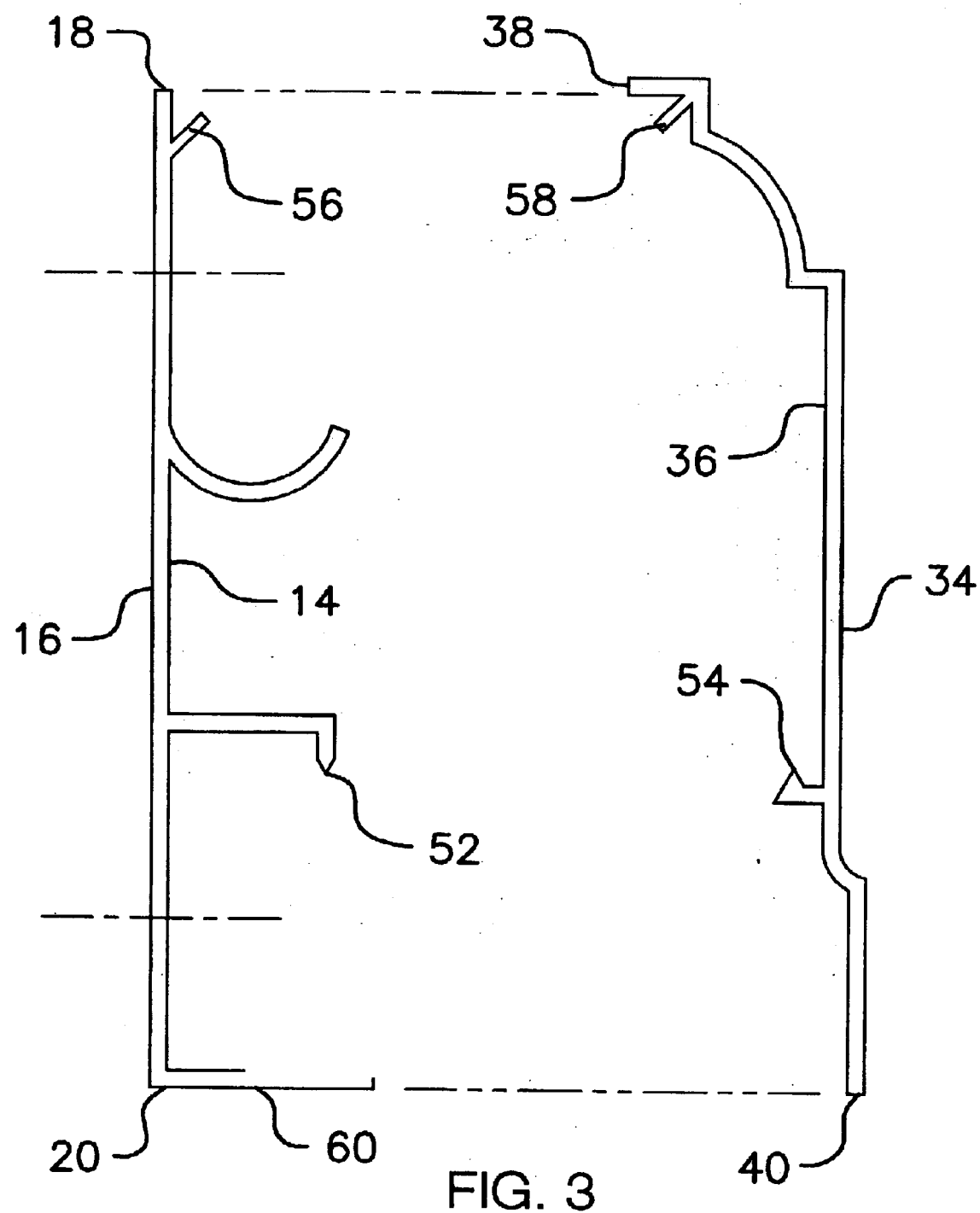
FIG. 3 is a schematic side view of the present invention.
Figure 4:
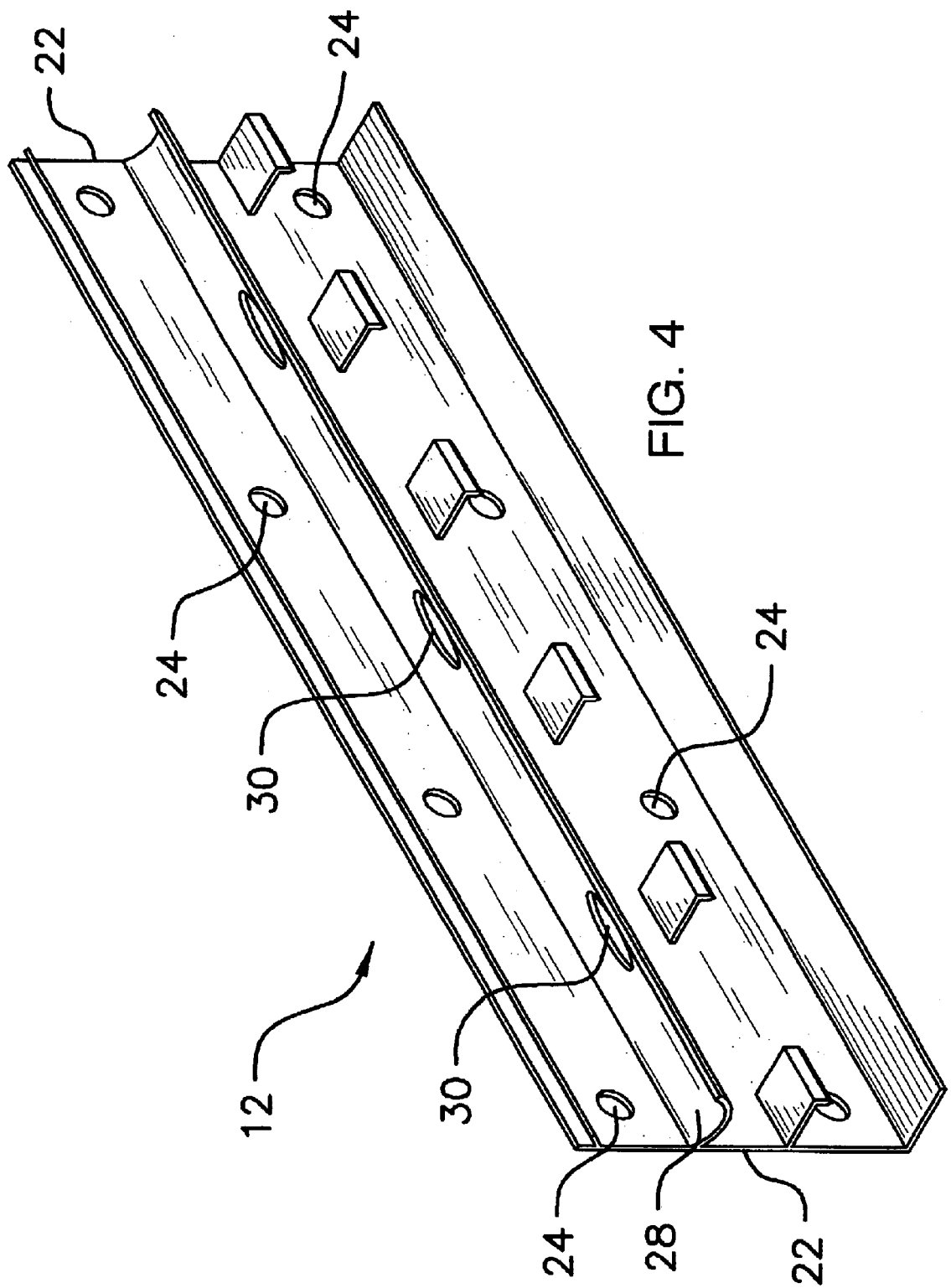
FIG. 4 is a schematic perspective view of the base panel of the present invention.
Figure 5:
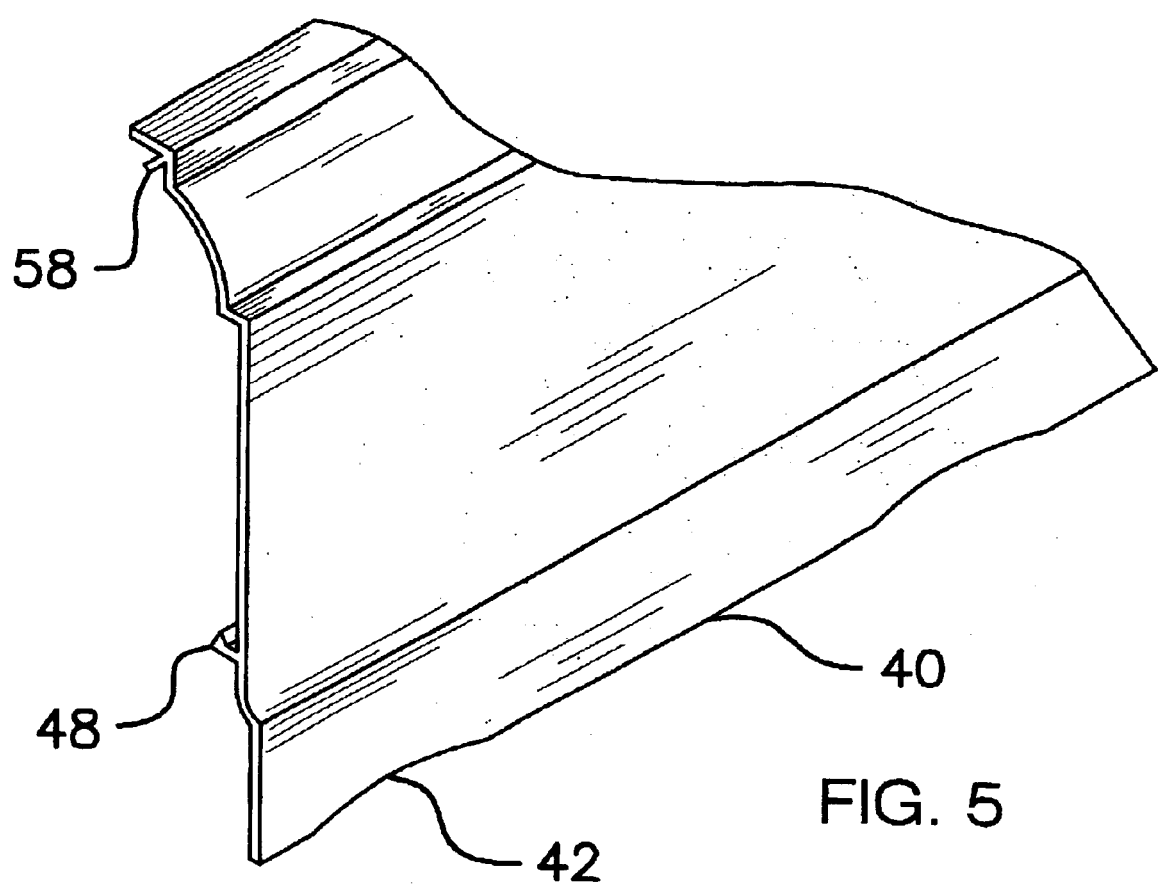
FIG. 5 is a schematic enlarged perspective view of the covering of the present invention.

With reference now to the drawings, and in particular to FIGS. 1 through 5 thereof, a new baseboard device embodying the principles and concepts of the present invention and generally designated by the reference numeral 10 will be described.

As best illustrated in FIGS. 1 through 5, the baseboard and insect capturing assembly 10 generally comprises a base panel 12 having a first side 14, a second side 16, a top edge 18, a bottom edge 20, and a pair of end edges 22. The base panel 12 has a plurality of openings 24 extending therethrough. Each of a plurality of fasteners 26 is removably extendable through one of the openings 24 and into a wall surface 6. The fasteners 26 may be conventional screws or nails.

A trough 28 is attached to the first side 14 of the base panel 12. The trough 28 generally extends between the end edges 22 and is positioned generally between the top edge 18 and the bottom edge 20. The trough 28 has a plurality of apertures 30 extending therethrough.

A covering 32 is positionable over the base panel 12. The covering 32 has an outer surface 34, an inner surface 36, an upper edge 38 and a lower edge 40. The lower edge 40 is positioned adjacent to a floor surface 8 when the upper edge 38 is positioned adjacent to the top edge 18 of the base panel 12. The covering 32 is either stepped or arcuate to form a space for the trough 28. The lower edge 40 has a plurality notches 42 therein. The notches 42 are high enough for insects to travel under but are low enough to avoid detection by a casual glance at the notches 42. Ideally, the notches 42 have a height between 1 mm and 5 mm. The upper edge 38 preferably forms a flange for positioning over the top edge 18. The covering 32, in general, may have any decorative shape desired.

A securing assembly 44 is attached to the first side 14 of the base panel 12 and the inner surface 36 of the covering 32 for releasably securing the covering 32 to the base panel 12. Though many types of securing assemblies may be employed, the securing assembly 44 of the present device includes a plurality of first mating portions 46 and a second mating portion 48. Each of the first mating portions 46 is attached to the first side 14. The first mating portions 46 are spaced from each other. The second mating portion 48 is attached to the inner surface 36 and extends between a pair of opposite edges 50 of the cover 32. The second mating portion 48 is positioned such that the second mating portion 48 may be coupled to each of the first mating portions 46 when the top edge 18 is adjacent to the upper edge 38. Preferably, the first mating portions 48 include downward extending detents 52 and the second mating portions 50 include upward extending detents 54. This structure biases the covering 32 downward toward the floor surface 8.

Additional stabilizers may include a first flange 56 attached to the base panel 12. The first flange 56 is positioned on the first side 14 and is located adjacent to the top edge 18. A second flange 58 is attached to the inner surface 36 and positioned generally adjacent to the upper edge 38. The first flange 56 is angled upward and the second flange 58 is angled downward. The second flange 58 is positioned over the first flange 56 to bias the upper edge 38 away from the floor surface 8. The tension between the flanges 56, 58 and the securing assembly 44 aids in the stability of the covering 32.

A foot portion 60 is attached to and extends away from the bottom edge 20 of the base panel 12. The foot portion 60 abuts the inner surface 36 when the covering 32 is secured to the base panel 12. The foot portion 60 also aids in the stability of the covering 32 by preventing the lower edge 40 from moving toward the base panel 12. The foot portion 60 also prevents insects from crawling under the base panel 12. The notches 42 must have a height greater than the foot portion 60.

In use, the base panel 12 is positioned on a wall surface 6 and the cover 32 attached to the base panel 12. The trough 28 is sprayed with insecticide. Insects, when they hide from people or light, will try to hide under the baseboard assembly 10. The insects will pass through the notches 42 and will climb up to the trough 28 where they will be killed. As needed, the user will remove the covering 32 and vacuum or otherwise remove all insects found in the trough 28 or against the base panel 12. New insecticide is positioned in the trough 28 and the covering 32 replaced.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A floorboard assembly for positioning on a wall surface, said floorboard assembly being adapted for receiving insects, said: assembly comprising:
    a base panel having a first side, a second side, a top edge, a bottom edge, and a pair of end edges, said base panel having a plurality of openings extending therethrough, wherein each of a plurality of fasteners is removably extendable through one of said openings and into the wall surface;
    a trough being attached to said first side of said base panel, said trough generally extending between said end edges and being positioned generally between said top edge and said bottom edge;
    a covering being positionable over said base panel, said covering having an outer surface, an inner surface, an upper edge and a lower edge, wherein said lower edge is positioned adjacent to a floor surface when said upper edge is positioned adjacent to said top edge of said panel, said lower edge having a plurality notches therein; and
    a securing assembly being attached to said first side of said base panel and said inner surface of said covering for releasably securing said covering to said base panel.

2. The floorboard assembly of claim 1, wherein said trough has a plurality of apertures extending therethrough.

3. The floorboard assembly of claim 1, wherein said upper edge of said covering forms a flange for positioning over said top edge.

4. The floorboard assembly of claim 1, wherein said securing assembly includes a plurality of first mating portions and a second mating portion, each of said first mating portions being attached to said first side, said first mating portions being spaced from each other, said second mating portion being attached to said inner surface and extending between a pair of opposite edges of said cover, said second mating portion being positioned such that said second mating portion may be coupled to each of said first mating portions when said top edge is adjacent to said upper edge.

5. The floorboard assembly of claim 1, further including a foot portion being attached to and extending away from said bottom edge of said base panel, said foot portion abutting said inner surface when said covering is secured to said base panel.

6. A floorboard assembly for positioning on a wall surface, said floorboard assembly being adapted for receiving insects, said assembly comprising:
    a base panel having a first side, a second side, a top edge, a bottom edge, and a pair of end edges, said base panel having a plurality of openings extending therethrough, wherein each of a plurality of fasteners is removably extendable through one of said openings and into the wall surface;
    a trough being attached to said first side of said base panel, said trough generally extending between said end edges and being positioned generally between said top edge and said bottom edge, said trough having a plurality of apertures extending therethrough;
    a covering being positionable over said base panel, said covering having an outer surface, an inner surface, an upper edge and a lower edge, wherein said lower edge is positioned adjacent to a floor surface when said upper edge is positioned adjacent to said top edge of said panel, said lower edge having a plurality notches therein, said upper edge forming a flange for positioning over said top edge;
    a securing assembly being attached to said first side of said base panel and said inner surface of said covering for releasably securing said covering to said base panel, said securing assembly including a plurality of first mating portions and a second mating portion, each of said first mating portions being attached to said first side, said first mating portions being spaced from each other, said second mating portion being attached to said inner surface and extending between a pair of opposite edges of said cover, said second mating portion being positioned such that said second mating portion may be coupled to each of said first mating portions when said top edge is adjacent to said upper edge; and
    a foot portion being attached to and extending away from said bottom edge of said base panel, said foot portion abutting said inner surface when said covering is secured to said base panel.

* * * * *